J. W. FARLEY.
PLATE THIMBLE FOR PIPES.
APPLICATION FILED NOV. 8, 1917.
1,278,895.
Patented Sept. 17, 1918.
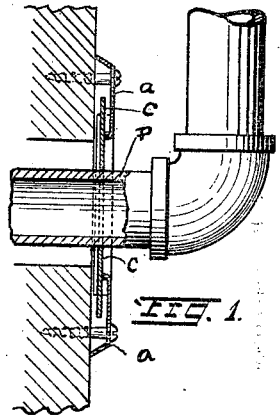
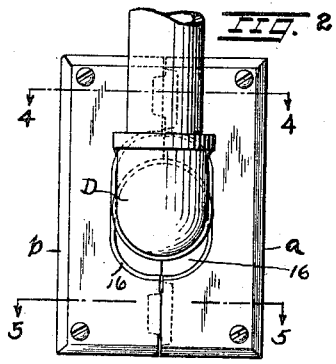
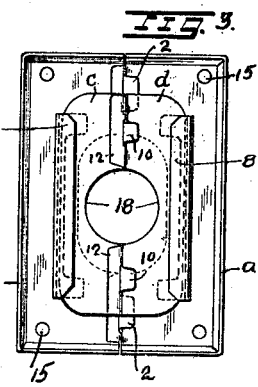
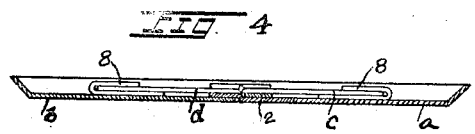
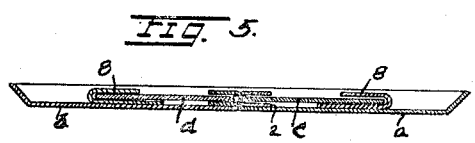
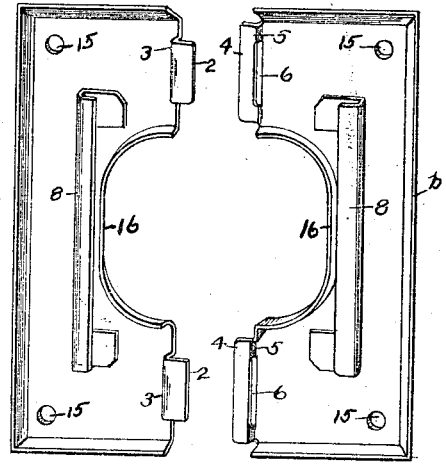
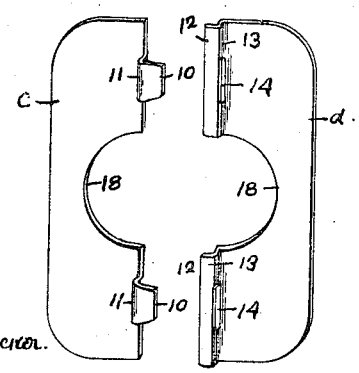
Inventor
JOHN W. FARLEY
Witness
Geo E Kricker
By Fisher & Moser
Attorney

UNITED STATES PATENT OFFICE.

JOHN W. FARLEY, OF CLEVELAND, OHIO.

PLATE-THIMBLE FOR PIPES.

1,278,895. Specification of Letters Patent. Patented Sept. 17, 1918.

Application filed November 8, 1917. Serial No. 200,884.

*To all whom it may concern:*

Be it known that I, JOHN W. FARLEY, citizen of the United States, residing at Cleveland, in the county of Cuyahoga and State of Ohio, have invented certain new and useful Improvements in Plate-Thimbles for Pipes, of which the following is a specification.

My invention relates to a plate-shaped thimble for steam, hot water and other pipes, adapted to take up expansion and contraction in such pipes where they pass through relatively enlarged openings in walls and other places, all substantially as shown and described and particularly pointed out in the claim.

In the accompanying drawings, Figure 1 is a sectional elevation of a wall with a section of a pipe therein and having my improved thimble in working position over the pipe and covering the opening in the wall. Fig. 2 is a front elevation of Fig. 1, and Fig. 3 is a rear elevation of the thimble as a whole. Fig. 4 is a cross section on line 4—4, Fig. 2, omitting the pipe, and Fig. 5 is a cross section on line 5—5, Fig. 2.

Fig. 6 is a cross section of the thimble showing the parts thereof in disconnecting relations. Figs. 7 and 8 are details of the two primary or outer sections or elements of the thimble, and Figs. 9 and 10 are details of the inner or secondary sections or elements.

The entire device as shown is a thimble of plate shape and is made up of plate or sheet metal sections stamped into the desired shape and adapted to lie or rest flatwise against the wall about the pipe and covering the hole through which the pipe passes.

In this connection it should be understood that steam, hot water and other pipes employed to carry heated fluids or liquids and which are hot and cold at intervals, are liable to such expansion and contraction under widely different temperatures that the difference is expressed in an inch or more at a given point with a long pipe when it gets very hot, and it goes back to its original position or relation when it gets cool. Hence it is the practice by carpenters and builders to anticipate these conditions by forming oblong or enlarged holes or openings in walls for the passage of such pipes, but since such holes frequently must be considerably larger than the pipes they leave unsightly places which it is desirable to conceal. Hence the present invention, wherein accommodation for expansion and contraction is provided for by an ornamental covering for the opening.

The invention therefore consists of a plate-shaped thimble consisting of two primary or outer sections or elements $a$ and $b$, and two inner or secondary elements or sections $c$ and $d$, and which are adapted to be separably united into a single article of manufacture and sale by features of construction peculiar to each section as will now be seen.

Thus, the section $a$ has tongues 2 at its inner edge with slight shoulders 3 at their base and adapted to coöperate with tongues 4 on the opposite section having shoulders 5 at their base and slots 6 through said shoulders to receive the tongues 2. The said tongues interlock at their shoulders and can be separated or united when brought to the relation seen in Fig. 6. Then as the said sections are flattened they are locked together and present a flat close fitting connection which has the appearance externally of a single plate with a mere line at the middle, the said tongues being inside.

The said outer plates or plate sections are also provided with guideways or flanges 8 lengthwise on their inside formed by brazing or otherwise securing a strip of sheet metal on said plates and bending the same inward at one edge to produce said flanges or guideways, and the inner or secondary plate sections $c$ and $d$ are adapted to be slidably engaged within these flanges by sliding them in together endwise, and they may be reversed or turned end for end therein and serve the same purpose in either case.

The said inner plates or sections are connected in like manner as the outer sections, the section $c$ having tongues 10 with shoulders 11 at their base, and the section $d$ having tongues 12 with shoulders 13 at their base and slots 14 in said shoulders. Now, having connected the said plates $c$ and $d$ at said tongues they are slipped together endwise beneath the said flanges 8 and the complete unit is ready for use. The said outer plates have their edges turned or flanged inward to about the depth of the flanges 8 inside, so that the plate as a whole will bear all around at its edge with a close fit against a wall or other surface on which the device is secured, and holes 15 are provided to fix the device by screws in permanent working position. The outer plates are constructed at their inner edges with flanged recesses 16 corresponding each to a half of an oblong opening which the two recesses together produce when the plates are united and which provides for the movement of the pipe P under expansion and contraction as above set forth, and the inner plate sections have half round recesses 18 in their inner edges adapted to fit closely around the pipe, and being shorter than the outer plates can move up or down to afford the necessary accommodation, or crosswise if the parts are positioned in that way, and not uncover the oblong opening in the outer sections.

The thimble as thus shown and described is placed in position on the pipe and for service on the outside of the wall through which the pipe projects after the pipe has been placed in position, and automatically accommodates itself to contraction and expansion of the pipe as hereinbefore described.

What I claim is:

A thimble for pipes consisting of two main plates adapted to be permanently fixed in position and provided with opposite rounded recesses to engage about a pipe and one of said plates having plain right angled shouldered tongues and the other having corresponding shouldered tongues with slots through the shouldered base portions thereof adapted to receive the first named tongues in interlocked engagement and said plates having straight parallel flanged guide pieces affixed lengthwise thereto next behind the recesses therein, in combination with two auxiliary plates provided with opposite half round recesses and one of said plates having a plain shouldered tongue and the other a shouldered slotted tongue and said tongues adapted to make interlocking engagement with each other and slidably confined in said guideways.

Signed at Cleveland, in the county of Cuyahoga, and State of Ohio, this 30th day of October, 1917.

JOHN W. FARLEY.

Copies of this patent may be obtained for five cents each, by addressing the "Commissioner of Patents, Washington, D. C."